United States Patent
Sugiura (10) Patent No.: US 6,954,138 B1
(45) Date of Patent: Oct. 11, 2005

(54) IMAGE PROCESSING SYSTEM FOR IDENTIFYING CAR STEALER

(75) Inventor: Hiroshi Sugiura, Aichi (JP)

(73) Assignees: Hiroshi Sugiura, Nagoya (JP); Nagoya Toyopet Co., Ltd., Aichi-Ken (JP)

( * ) Notice: Subject to any disclaimer, the term of this patent is extended or adjusted under 35 U.S.C. 154(b) by 19 days.

(21) Appl. No.: 10/469,150

(22) PCT Filed: Mar. 29, 2002

(86) PCT No.: PCT/JP02/03252

§ 371 (c)(1),
(2), (4) Date: Aug. 27, 2003

(87) PCT Pub. No.: WO03/083570

PCT Pub. Date: Oct. 9, 2003

(51) Int. Cl.[7] ............................................... B60R 25/10
(52) U.S. Cl. ............................. 340/426.24; 340/426.1; 348/148; 348/151; 348/152
(58) Field of Search ........................ 340/426.24, 426.1, 340/426.28, 426.3; 348/148, 151, 152; 307/10.2, 10.8

(56) References Cited

U.S. PATENT DOCUMENTS

| | | | | |
|---|---|---|---|---|
| 5,282,182 A | * | 1/1994 | Kreuzer et al. | 369/21 |
| 5,430,431 A | * | 7/1995 | Nelson | 340/434 |
| 5,939,975 A | * | 8/1999 | Tsuria et al. | 340/426.18 |
| 6,151,065 A | * | 11/2000 | Steed et al. | 348/148 |
| 6,525,653 B1 | * | 2/2003 | Rigmaiden | 340/426.1 |
| 6,672,745 B1 | * | 1/2004 | Bauer et al. | 362/545 |
| 6,703,925 B2 | * | 3/2004 | Steffel | 340/425.5 |

* cited by examiner

*Primary Examiner*—Daniel Wu
*Assistant Examiner*—Sihong Huang
(74) *Attorney, Agent, or Firm*—Clark & Brody (57) ABSTRACT

An image processing system for identifying car stealer to be set in a car involving a high risk to be stolen, comprising a device to take the full-faced image of the criminal without his/her knowledge.

A dashboard panel (2) in front of the driver's seat comprises a meter housing (10) provided on a lamp case (12) for storing a light source (13) of indicator lamps (6a) and (6b). An indicator panel (14) made of transparent material is provided in front of the dashboard panel (2), therein the lighting from the light source is sent from the lamp case (12) to the front surface of the dashboard panel (2). An image taking device (21) which is a candid camera is provided in the lamp case (12), therein the image of the person sitting in the driver's seat can be taken through the indicator panel (14). An image memory device (22) of the candid camera corresponds to the lighting of the indicator lamps (6a) and (6b), and save the image taken by the image taking device (21). An indicator turn signal lamp is preferably used for the indicator lamps (6a) and (6b).

16 Claims, 6 Drawing Sheets

IMAGE PROCESSING SYSTEM FOR IDENTIFYING CAR STEALER

FIELD OF THE INVENTION

This invention relates to an image processing system for identifying car stealer, which is set especially in a very valuable car, therein the image of the criminal sitting in the driver's seat is automatically taken by camera.

The car stealer identifying system in this invention can be used for cash transport cars, cars to transport valuable goods (such as paintings, jewelry, or the like), patrol cars, luxury cars, or the like.

Also, the car stealer identifying system in this invention can be used for means of transport such as trains, aircraft or the like as well as the above-identified cars.

BACKGROUND OF THE INVENTION

In general, when a cash transport car or the like is stolen by a gang, the hints to identify such stealer are his or her physiognomy, voice, or clothes that the passenger or witness at the scene of the accident, or fingerprints or personal effects that such stealer left behind.

However, human memory power is unreliable. Even more so if people suddenly come across such an unexpected event, or they are on the actual dangerous spot.

And it requires a lot of time and work to examine the fingerprint and find out the personal effects, so sometimes the criminal cannot be found out before the statute of limitations is to expire.

The conventional system for identifying the car stealer suggests that a camera for taking the image of the criminal is set in a car as disclosed in Japanese Patent Gazette Nos. H10-134282, 2000-50251, etc. For instance, a camera is set in a room mirror in the car (as disclosed in Japanese Patent Gazette No. 2000-6762), in a side mirror of the car (as disclosed in Japanese Patent Gazette No. H09-193711), or others.

However, the aforementioned system can be easily found by the criminal, and such camera may be purposely destroyed while he/she is on the run. Or if the film is taken away from the system, no evidence can be verified.

On the other hand, a camera for the aforementioned system can be set in a trunk, car seats, behind the dashboard panel (as disclosed in Japanese Patent Gazette No. 2001-322533) or other places which the criminal may not be able to find out. However, the camera set in such places sometimes may take no image of the criminal or clear image of the criminal if it is dark in the car, and it becomes difficult to identify the criminal.

Therefore, the objective of this invention is to provide an image processing system for identifying car stealer to be set in a car involving a high risk to be stolen, comprising a device to take the full-faced image of the criminal without his/her knowledge.

SUMMARY OF THE INVENTION (1) To solve the aforementioned problems, the image processing system for identifying car stealer proposed in this invention is a device to take the full-faced image of the criminal by a candid camera provided in the dashboard panel in front of the driver's seat, characterized by comprising a light source of the indicator lamp installed in the aforementioned dashboard panel, a lamp case to install the aforementioned light source, an indicator panel made of transparent material provided on the front area of the aforementioned dashboard panel and leads the light of the aforementioned light source from the lamp case to the front side of the aforementioned dashboard panel, and an image taking device of the aforementioned candid camera which is installed in the aforementioned lamp case and takes the image of the criminal sitting in the driver's seat, and an image memory device to save the image data obtained by the aforementioned image taking device while synchronizing with the lighting of the aforementioned indicator lamp.

In this invention, when the criminal steals a car and drives the car, the aforementioned image-taking device takes the full-faced image of the criminal sitting in the driver's seat. When the criminal conducts the specific operation, the indicator on the dashboard panel turns on a light, and at the same time, the aforementioned image memory device saves the full-faced image of the criminal.

The driver's face is normally positioned opposite to the dashboard panel. So, it is easy to take the full-faced image of the criminal. Also, the light effect (flash effect) of the indicator lamp enhances the function to take clear image of the criminal. Moreover, the indicator panel covers the aforementioned image-taking device inside of the dashboard panel, therefore, the candid camera cannot be found by the criminal.

Ordinary types of lamps for the conventional dashboard panel i.e. the lamps for turn signal, high beam, transmission indicator, or other indicators can be also used for the aforementioned indicator lamp.

It is possible to use different types of indicator lamps for the aforementioned image taking device other than the indicator lamp for synchronizing with the image input timing of the aforementioned image memory device. For example, it is also possible to put the aforementioned image taking device into the lamp case of the indicator high beam lamp, and input the image from the aforementioned image taking device by the image memory device while synchronizing with the lighting of the indicator turn signal lamp.

The aforementioned image-taking device is preferably a CCD camera (charge-coupled device camera) comprising a pinhole lens since the CCD camera can be easily downsized and compactly stored into the lamp case of the dashboard panel. Picture element of the CCD camera should be 100,000 pixels or more, or preferably 200,000 pixels or more.

There should be an appropriate clearance between the image-taking device and indicator panel so that the image-taking device fixed in the dashboard panel cannot be found. Also, to prevent the light of the indicator from fading, the image-taking device should not be fixed in the center of the light from the light source.

Fixing method for the aforementioned image-taking device is not limited, and other methods such as fixing with screws, adhesive agent or the like can be applied.

Plastic, glass, or other transparent materials should be used for the aforementioned indicator panel so that the image of the person sitting in the driver's seat can be taken through such transparent panel. Also, the indicator panel should not be colorless but preferably green, red, orange or other colors so that the person in the driver's seat cannot easily find the image-taking device. Or, it might be possible to apply special material such as mirror-finished material or the like on the surface of the indicator panel so that the inside of the lamp case cannot be disclosed from the driver's seat.

The aforementioned image memory device should preferably be a device to save the image of the person in the driver's seat as an image data file. The device is preferably a magnetic saving device or the like which is generally used for digital cameras or the like. The images saved in the aforementioned image memory device can be seen on the computer display or the like, and also they can be printed out as photographs. Moreover, normal photo films can be used.

As for the operation of the aforementioned image memory device, the owner of the car or the like turns on or off the power switch. The image memory device is to be normally off to avoid filming the image of the driver or the owner of the car when he/her drives the car. The driver should turn on the switch of the image memory device before leaving the car. Even if the car is stolen, the full-faced image of the stealer is saved in the aforementioned image memory device by turning on the specified indicator lamp.

The input image saved in the aforementioned image memory device is not only static image but also moving image. While the indicator lamp is on or flashing, full-faced image and motion of the stealer can be filmed for strong and important evidence.

The aforementioned image-taking device is connected to the image memory device by cables. A one-cable method is preferable to a two-cable method since the two-cable method requires a smaller space for installing the image-taking device. Also, a radio receiver can be used if necessary.

The position to set the aforementioned image memory device is not particularly specified. For example the image memory device can be set in a space behind the dashboard panel, under the driver's seat, inside of the dashboard or the like.

(2) The image processing system for identifying car stealer proposed in this invention is characterized in that the aforementioned indicator lamp comprises a symmetrical pair of indicator turn signal lamps.

Driver's posture is different depending on his/her physical constitution or driving manner. Some people may drive the car leaning on the window or others may drive the car being closer to the front passenger seat. If the driver's position is different, the front view of the criminal may not be clearly taken by an image-taking device provided on only one place.

In general, turn signal lamps are symmetrically provided at a regular interval on the dashboard panel, and the driver sits opposite to either right or left turn signal lamp. Also, the turn signal lamps are comparatively bright and widely cover the driver's seat. Thus, the full-faced front image of the criminal can be taken by right or left turn signal lamp regardless of his/her posture.

(3) The image processing system for identifying car stealer proposed in this invention is characterized in that the aforementioned turn signal lamp is turned on while the engine key switch is on.

If the aforementioned image memory device is synchronized with lighting of the turn signal lamp, normally the image of the driver is taken by flipping the lever of the turn signal lamp to right or left. However, the criminal may not use the lever when he/she steals and drives the car.

This invention proposes a system to turn on the right and left turn signal lamp when the engine key switch is on as well as when the winker lever is operated, and to take the image of the person sitting in the driver's seat by the aforementioned image-taking device corresponding to each lamp. Thus, before the engine starts, the front image of the criminal can be completely taken from the right and left turn signal lamps.

This mechanical structure creates a compound eye effect and the image of the criminal can be taken simultaneously by the right and left image taking devices, which create three-dimensional image of the criminal.

(4) The image processing system for identifying car stealer is this invention is characterized by comprising an on-contact opening and closing relay in which the aforementioned turn signal lamps and the image memory device are electrically operated by the battery voltage when the engine key switch is on and the aforementioned turn signal lamps and the image memory device are electrically shut down by the alternator voltage after the engine has started.

In general, the engine key switch of the automobile electrical circuit has on-and off contact points. When turning the key from the off-contact point to on-contact point, the electricity generates from the battery and goes to the dashboard panel, and then each indicator lamp turns on. Normally the turn signal lamp is not electrically operated while the contact point is on until the right or left turn lever is flipped.

In order to turn on the turn signal lamp while the contact point is on, it is necessary to shut off the electricity to the turn signal lamp so that the turn signal lamp goes off after the engine has started. However, providing special switches or cables for the above process requires additional space to store and eventually such changes of design will increase the production cost.

In this invention, the aforementioned on-contact point opening and closing relay and minor changes to the existing circuit enable the turn signal lamp of the dashboard panel lighting only when the contact point is on before the engine starts. Thus, the reliable identifying system to take the front view of the criminal before stating the engine can be installed in the existing car at low cost.

(5) The image processing system for identifying car stealer in this invention is characterized in that the mirror finish is provided on the internal surface of the aforementioned lamp case.

If the aforementioned image taking device is mounted in the lamp case, the image taking device blocks the light of the aforementioned light source, and the light may not be illuminated over the front area of the dashboard panel. Therefore, the light illuminated over the dashboard may become darker than usual. This invention proposes the mirror finish provided on the internal surface of the lamp case, which reflects the light of the turn signal lamp on the mirror surface and efficiently illuminates the driver's seat through the indicator panel. This, the full-faced front view image of the criminal can be clearly taken.

(6) The image processing system for identifying car stealer proposed in this invention can be used together with other devices to obtain more accurate evidence for identify the criminal. For example, a night vision device (such as CCD camera or the like) can be used with an infrared light projector set in the car room. Or, a voice recording microphone can be used, which operates corresponding to a door switch or room lamp switch so that the voice of the criminal can be recorded.

DETAILED DESCRIPTION OF THE DRAWINGS

Embodiment in this invention will now be described according to the drawings.

Figure 3:
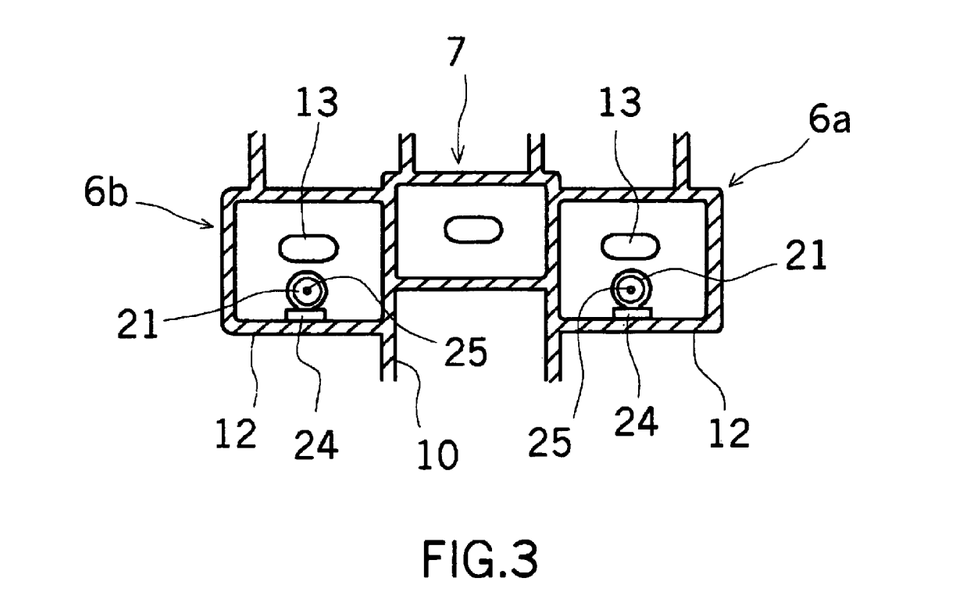
FIG. 3 is a cross-sectional view of the dashboard as an embodiment in this invention.

A dashboard panel as an embodiment in this invention is shown in FIG. 3.

Dashboard (2) is comprises speed meter (3), tachometer (4) and indicator lamps (6a, 6b, 7 and 8) in position. (6a) and (6b) are turn signal lamps, (7) is a high beam lamp, and (8) is a transmission lamp.

In this embodiment, a candid camera is installed in each position of the right and left turn signal lamps (6a) and (6b). The candid camera behind the dashboard panel cannot be seen from the driver's seat.

Figure 1:
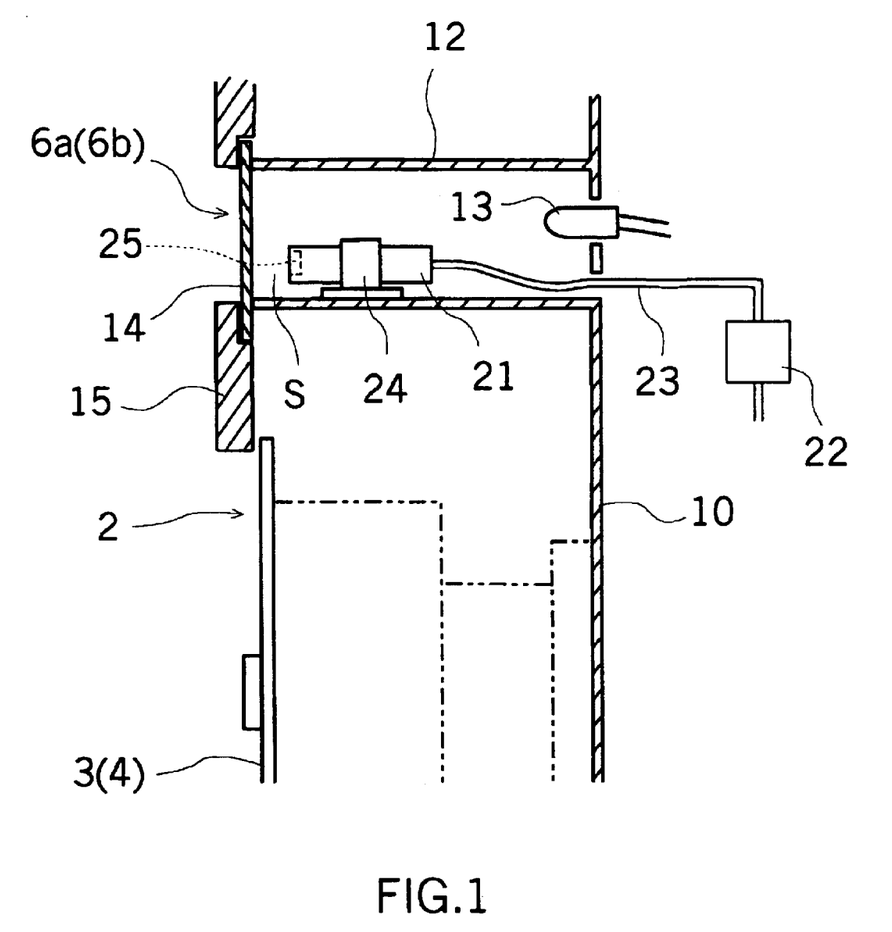
FIG. 1 is a partial longitudinal section of a dashboard as an embodiment in this invention.
Figure 2:
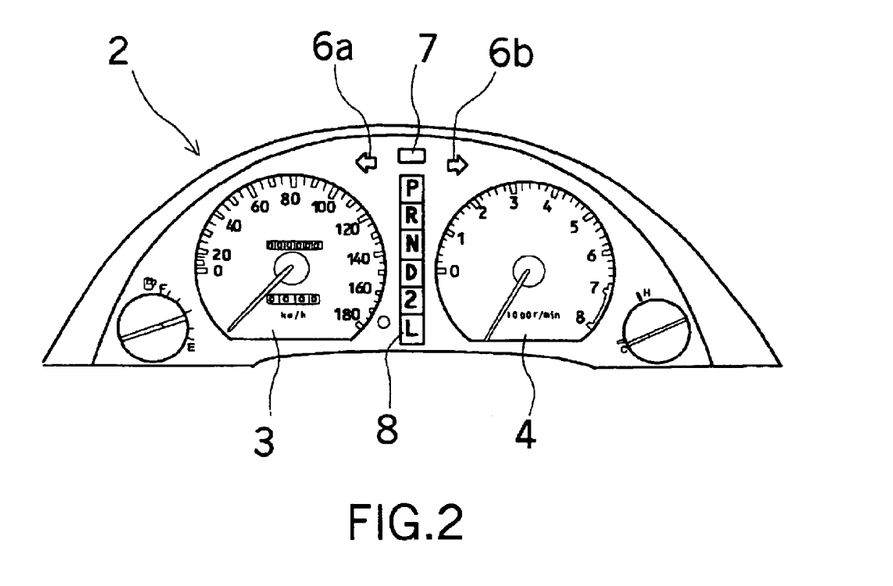
FIG. 2 is a front view of the dashboard panel as an embodiment in this invention.

As indicated in FIGS. 1 and 3, a meter housing (10) is provided behind the dashboard panel (2), thereupon, the lamp cases (12, 12) for fixing the right and left turn signal lamps (6a) and (6b) are jointly formed.

The light source (13) made of tungsten, LED or the like is installed in the inner part of the lamp case. An indicator panel (14) made of transparent material in the open front space of the lamp case (12), and the light source (13) illuminates the driver's seat through the indicator panel (14).

A front cover (15) is provided on the front side of the meter housing (10). Frames in the shape of an arrow to flash the right and left turn signal lamps (6a) and (6b) are provided on the front cover (15). The said front cover (15) and lamp case (12) are fixed by inserting the indicator panel (14) in between.

The candid camera comprises a CCD camera (21) and a memory device (22), and the said CCD camera (21) is stored in the lamp case (12). The CCD camera (21) and the memory device (22) are connected by a cable (23). Also, the memory device (22) is set behind the meter housing (10).

The CCD camera (21) is fixed on the internal surface of the lamp case (12) by a stay (24). A pinhole lens (25) is provided on the tip of the CCD camera (21), and the view of the driver's seat can be observed by the pinhole lens (25) through the indicator panel (14). A clearance (S) is provided between the indicator panel (14) and the pinhole lens (25) so that the CCD camera (21) cannot be seen from the driver's side.

As indicated in FIGS. 1 and 3, the CCD camera (21) and the light source (13) are precisely positioned so that the CCD camera (21) does not come to the center of the light source (13). Thus, the light source (13) brightly illuminates the indicator panel (14), and the CCD camera is not easily reflected on the indicator panel (14).

Also, a mirror finish such as plating or the like can be applied on the internal surface of the lamp case (12) so that the light of the light source (13) reflects in the lamp case and goes through the indicator panel (14), and finally the turn signal lamps (6a) and (6b) illuminate more brightly.

Next, a circuit diagram of the embodiment in this invention will be described.

Figure 4:
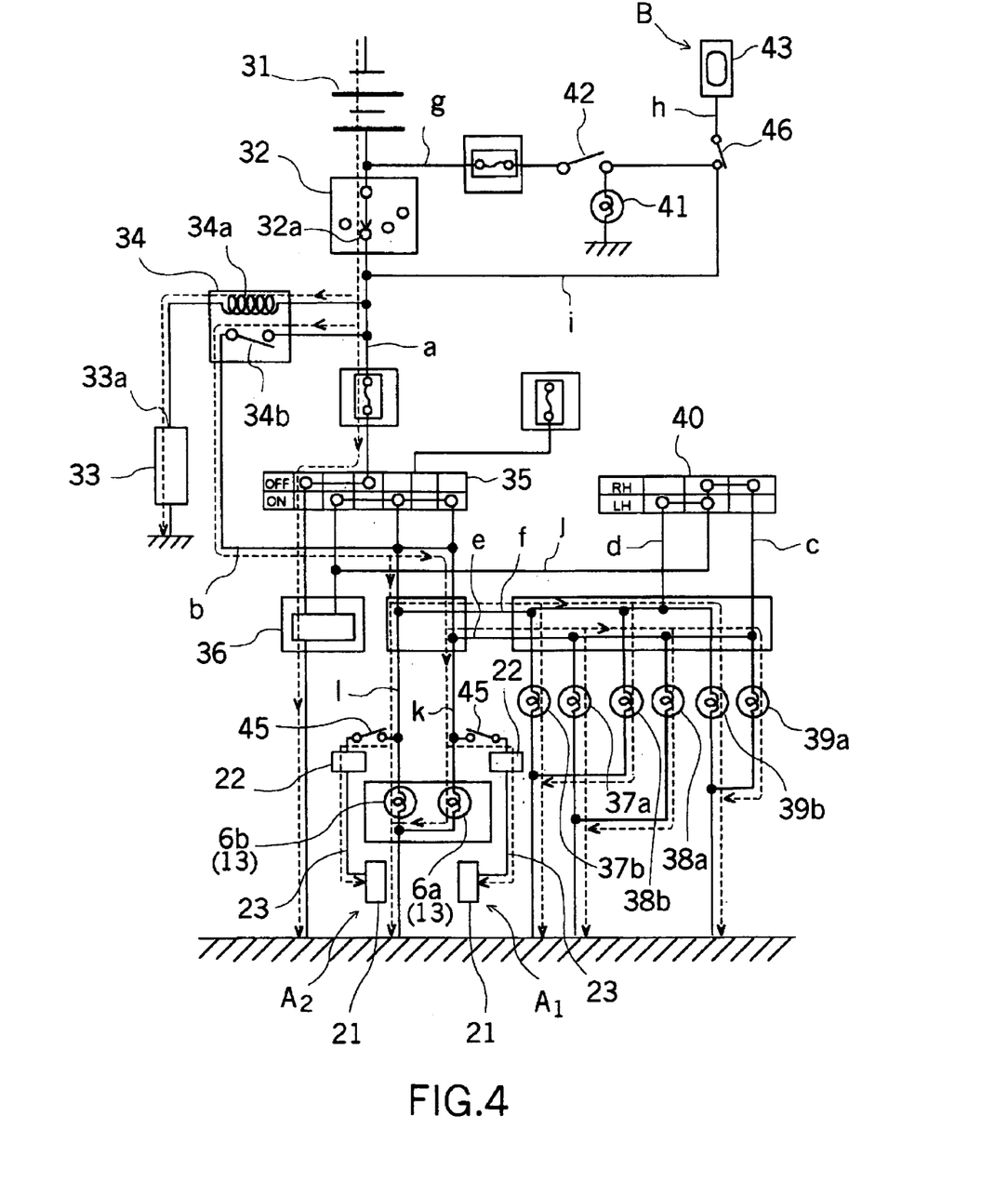
FIG. 4 is a circuit diagram of the embodiment in this invention, describing a status when the engine key switch is set to on, FIG. 5 is a circuit diagram of the embodiment in this invention, showing a status after the engine has started.

FIG. 4 shows a function circuit which automatically operates the right-and-left candid cameras (A1) and (A2), comprising a electric (electronic) shutter to take an image of the criminal sitting in the driver's seat, and a voice recorder (B) to record a voice of the criminal breaking into the car. Also, the candid cameras (A1) and (A2) comprise the aforementioned CCD camera (21) and memory device (22).

Main power dispatching circuit (a) connecting to a battery (31) comprises an engine key switch (32).

A circuit connecting an on-contact point (32a) of the key switch (32) to an L-contact point (33a) of an alternator (33) comprises a coil (34a) for an on-contact point circuit relay (34) that is never installed in the circuit of the existing cars.

One end of a contact point (34b) of the on-contact point circuit relay (34) is connected to the on-contact point (32a). Other contact point is conducted to shutter circuit (b), lighting circuits (k) and (l) of the turn signal lamps (6a), to an electrical shutter (not shown in Fig.) of the memory device (22).

A flasher switch (relay) (36) is connected to the main power dispatching circuit (a) via a hazard switch. The flasher switch controls the timing of each lamp flash for right or left turn.

The flasher switch (36) is connected to a combination switch (40) via a flashing circuit (j). The combination switch (40) makes it possible to take either a right-turn flashing circuit (c) or a left-turn flashing circuit (d) when flipping the directional-signal lever to tell the traveling direction to the driver behind.

A front turn lamp (37a) and a side turn lamp (38a) for a right turn and a front turn lamp (37b), side turn lamp (38b) and rear turn lamp (39b) for a left turn are divergently connected to the combination switch (40) via the right-turn flashing circuit (c) and left-turn flashing circuit (d). The combination switch (40) and the turn signal lamps (6a) and (6b) are connected via an auxiliary circuits (e) and (f).

Also, the front turn lamps (37a) and (37b), the side turn lamps (38a) and (38b), and the rear turn lamps (39a) and (39b) are fixed on the car body.

A door switch circuit (g) is divergently connected to the main power dispatching circuit (a), which lights the door lamp (41) when the door is open. An output terminal of a door switch (42) is connected to a recording microphone (43) of the voice recorder (B) via a main recording circuit (h).

Also, the main recording circuit (h) is connected to an on-contact point (2a) of the key switch (32) via a sub-recording circuit (i).

The candid cameras (A1) and (A2) and the voice recorder (B) comprise manual switches (45) and (46). The manual switches (45) and (46) are interlocked, and the candid cameras (A1) and (A2) and the voice recorder (B) do not function while the car is used in a usual way, however they can be set to operate when the regular driver leaves the car.

Next, the operation of the above-identified circuit diagram will be described.

If a car stealer breaking into a car turns on the key switch (32) and turns it more to the on-contact point (32a), the coil (34) of the on-contact point circuit relay is electrically turned on, the contact point (34b) closes and then as shown in FIG. 4, an operating electricity flows to the turn signal lamps (6a) and (6b) and the candid cameras (A1) and (A2). Then the full-faced front image of the criminal sitting in the driver's seat can be taken by the candid cameras (A1) and (A2) in the illumination of the turn signal lamps (6a) and (6b).

Also, the front turn lamps (37a) and (37b), side turn lamps (38a) and (38b), and the rear turn lamps (39a) and (39b) are simultaneously turned on with electricity via the auxiliary circuits (e) and (f).

At this point, an L-terminal (33a) of the alternator (33) is grounded.

Figure 5:
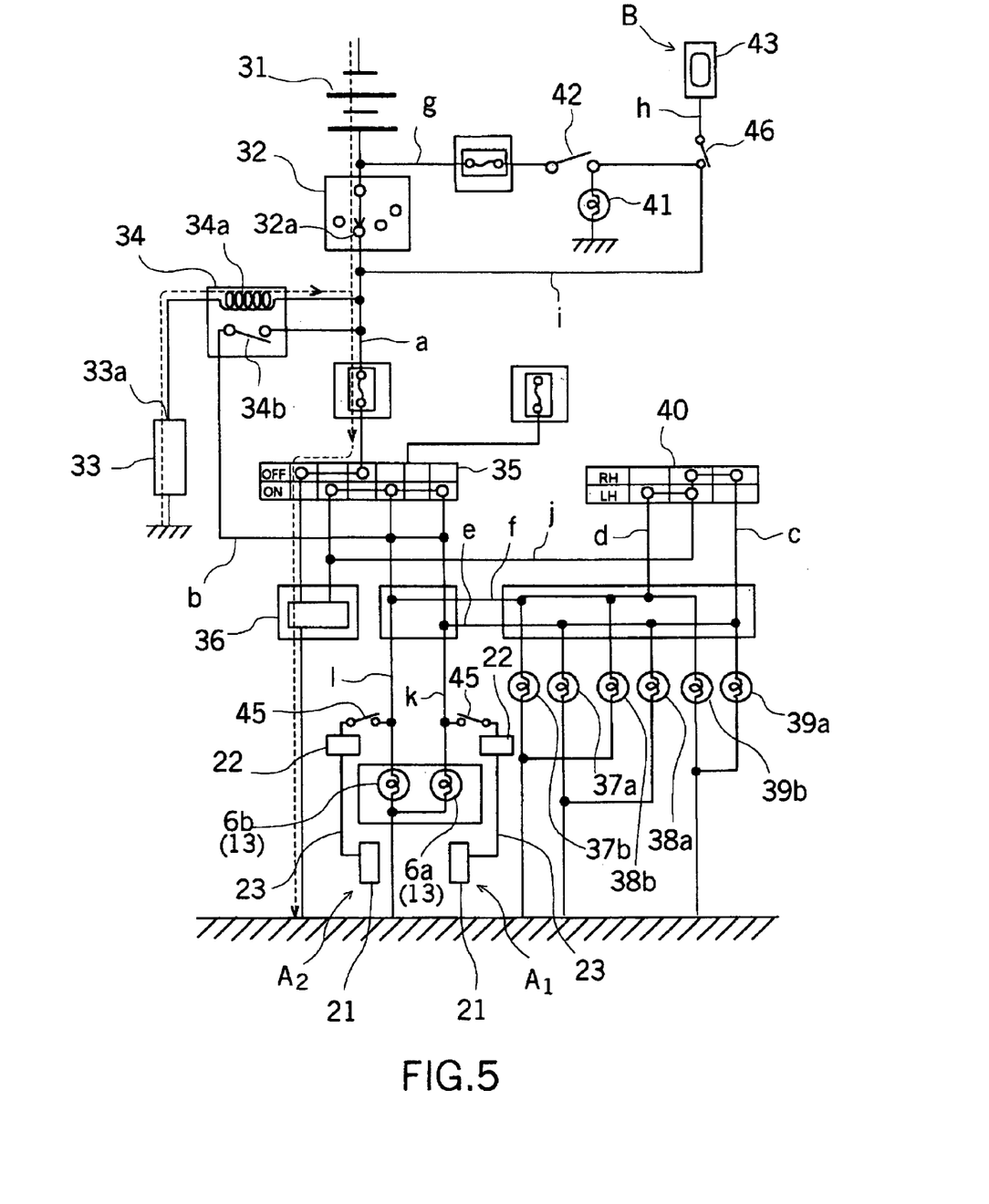

When turning the key switch (32) from the on-contact point (32a) to the start contact point, a starter activates and the engine starts. Then, as shown in FIG. 5, the alternator (33) starts generating electricity, and the battery power voltage is supplied to the L-terminal (33a), then the voltages between both ends of the coil (34a) become equal so that the on-contact point circuit relay (34) activates and the electricity to the shutter circuit (b) is shut off. Eventually, as shown in FIG. 5 (see chain lines), the active electricity flows only to the hazard switch (35) and the flasher switch (36) via the main power dispatching circuit (a).

Figure 6:
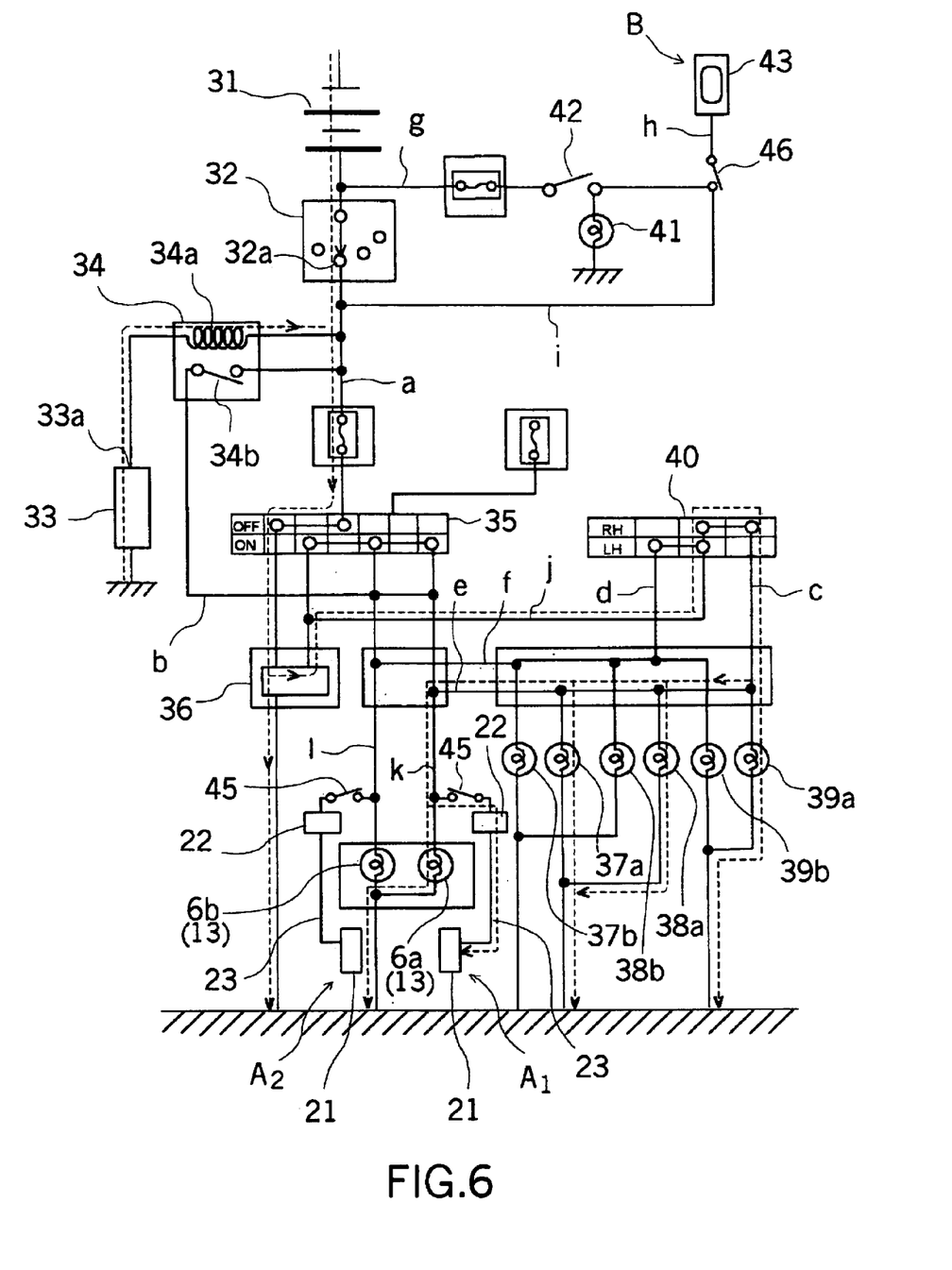
FIG. 6 is a circuit diagram of the embodiment in this invention, describing a status when the car turns to the right
Figure 7:
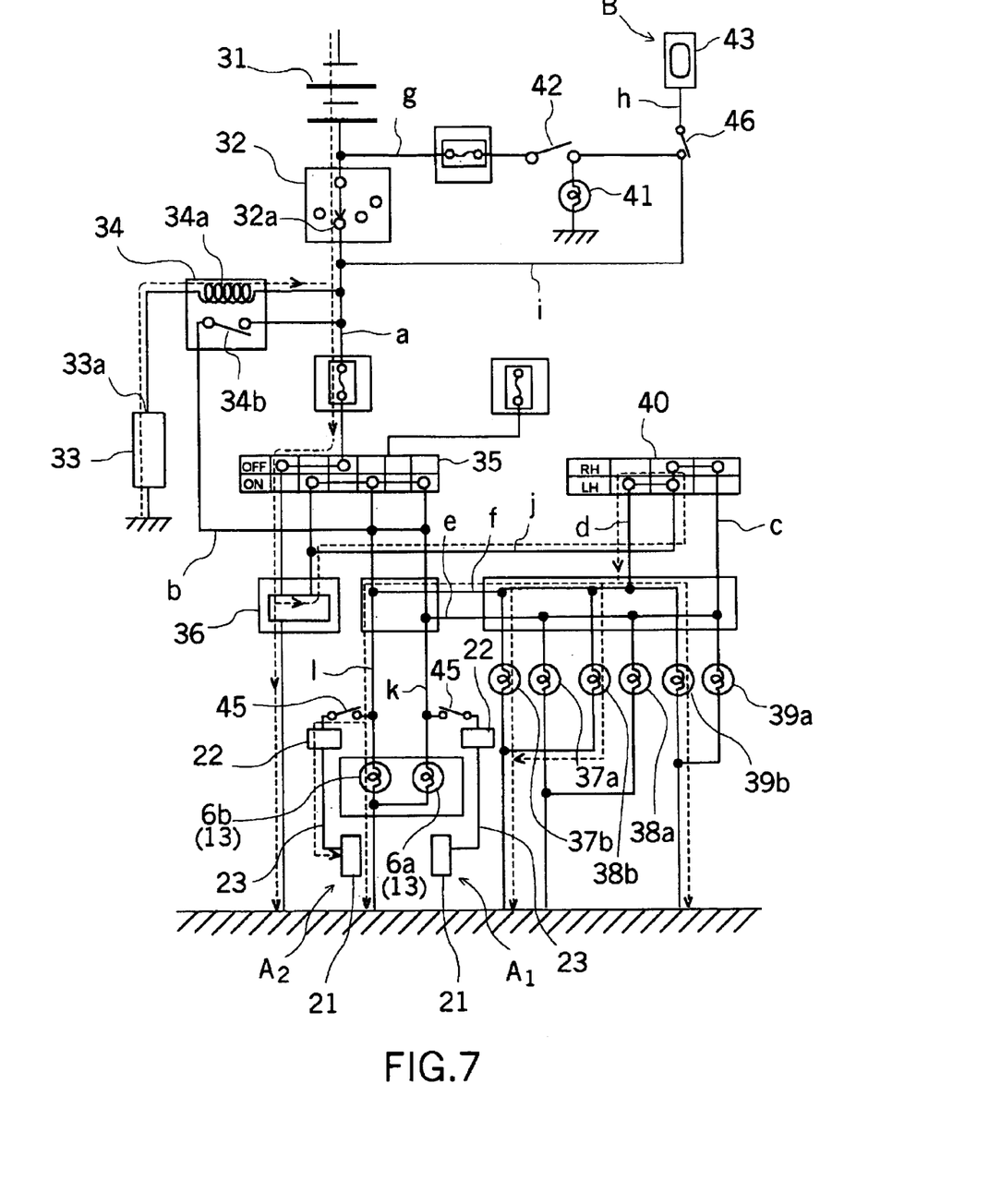
FIG. 7 is a circuit diagram of the embodiment in this invention, describing a status when the car turns to the left.

When the car approaches to an intersection, and the directional indicator lever is flipped, the electricity intermittently slows to the turn signal lamps (6a) and (6b), then the electric shutter of the candid camera (A1) or (A2) operates.

For instance, if the criminal turns the direction indicator lever for making a turn to the left, as shown in FIG. 7 (see chain lines), active electricity slows to the front turn lamp (37a), side turn lamp (38a), rear turn lamp (39a) and turn signal lamp (6a) via the hazard switch (35), flasher switch (36), and combination switch (40). And at the same time, the active electricity flows to the candid camera (A1), too and a photograph of the criminal's face can be taken.

As described above, every time the criminal flips the direction indicator lever, the electric shutter of the candid camera intermittently activates corresponding to the flashlight of the turn signal lamp (6a) or (6b) so that the clear image of the criminal can be intermittently taken by the candid cameras (A1) and (A2) until the lever is flipped to the original position.

Normally, the switch of the voice recorder (B) should be turned off. Once the criminal opens the door of the car, the active electricity flows to the voice recorder (B), then the door lamp in the room is turned on and the voice of the criminal is recorded by the recording microphone (43), and the voice can be recorded until the criminal closes the door.

After closing the door, the door switch (42) is shut off, and the recording is suspended. However, once the key switch (32) is turned to the on-contact point (32a), the electricity flows into the voice recorder (B) via the sub-recording circuit (i) and the main recording circuit (h), and the recording is restarted. Moreover, after starting the engine, the electricity flows into the voice recorder (B) via the door switch circuit (g) and the main recording circuit (h) so that the recording can be continued.

INDUSTRIAL APPLICABILITY

As described above, the image processing system for identifying car stealer in this invention has the following practical and beneficial effects.

(a) clear and vivid full-faced front images of the criminal can be taken without his/her knowledge while he/she is in the driver's seat.

(b) a device proposed in this invention can be installed in the existing car.

(c) candid cameras automatically take the images of the car stealer before starting the engine of the stolen car, and each time the car stealer flips the direction indicator lever in the car.

(d) while the door of the car is open, or when the criminal turns on the key switch, his/her voice is recorded, which makes it possible to determine if the criminal is acting alone or in a group, and also to identify his/her birthplace or nationality from his/her linguistic feature (languages, dialects, accents or the like).

(e) the criminal can be easily identified by the full-faced image and voice of the criminal even if the witness is not available.

(f) the information saved in the device is incomparably reliable and more accurate than that of the witness available, since the human's memory on the images and voice of the criminal is generally uncertain.

(g) Time and effort for identifying the criminal can be enormously reduced compared with the investigation conducted under the witness report, fingerprint, personal effects or the like.

(h) The national expenses used for criminal investigations can be drastically and incomparably cut off than before.

(i) More money and goods may be returned soon since the criminal can be arrested at an early stage of investigation.

(j) The information obtained in the device is accurate enough to reduce the abuse of human right from false investigation or waste of money and effort.

(k) It may be helpful to dissuade people from committing a crime.

What is claimed is:

1. An image processing system for identifying car stealer comprising a device to take a full-faced image of the criminal by a candid camera provided in the dashboard panel in front of the driver's seat, which is characterized by comprising a light source of the indicator lamp installed in the aforementioned dashboard panel, a lamp case to install the aforementioned light source, an indicator panel made of transparent material provided on the front area of the aforementioned dashboard panel and leads the light of the aforementioned light source from the lamp case to the front side of the aforementioned dashboard panel, and an image taking device of the aforementioned candid camera which is installed in the aforementioned lamp case and takes the image of the criminal sitting in the driver's seat, and an image memory device to save the image data obtained by the aforementioned image taking device while synchronizing with the lighting of the aforementioned indicator lamp.

2. An image processing system for identifying car stealer as described in claim 1, which is characterized in that the aforementioned indicator lamp comprises a symmetrical pair of indicator turn signal lamps.

3. An image processing system for identifying car stealer as described in claim 2, which is characterized in that the aforementioned turn signal lamp is turned on while the engine key switch is on.

4. An image processing system for identifying car stealer as described in claim 3, which is characterized by comprising an on-contact opening and closing relay in which the aforementioned turn signal lamps and the image memory device are electrically operated by the battery voltage when the engine key switch is on and the aforementioned turn signal lamps and the image memory device are electrically shut down by the alternator voltage after the engine has started.

5. An image processing system for identifying car stealer as described in claim 1, which is characterized in that the mirror finish is provided on the internal surface of the aforementioned lamp case.

6. An image processing system for identifying car stealer as described in claim 1, which is characterized by comprising a voice recording microphone to operate corresponding to a door switch.

7. An image processing system for identifying car stealer as described in claim 1, which is characterized by comprising an infrared light projector set in the car room, to be used with the aforementioned image taking device for night vision.

8. An image processing system for identifying car stealer as described in claim 2, which is characterized in that the mirror finish is provided on the internal surface of the aforementioned lamp case.

9. An image processing system for identifying car stealer as described in claim 3, which is characterized in that the mirror finish is provided on the internal surface of the aforementioned lamp case.

10. An image processing system for identifying car stealer as described in claim 4, which is characterized in that the mirror finish is provided on the internal surface of the aforementioned lamp case.

11. An image processing system for identifying car stealer as described in claim 2, which is characterized by comprising a voice recording microphone to operate corresponding to a door switch.

12. An image processing system for identifying car stealer as described in claim 3, which is characterized by comprising a voice recording microphone to operate corresponding to a door switch.

13. An image processing system for identifying car stealer as described in claim 4, which is characterized by comprising a voice recording microphone to operate corresponding to a door switch.

14. An image processing system for identifying car stealer as described in claim 2, which is characterized by comprising an infrared light projector set in the car room, to be used with the aforementioned image taking device for night vision.

15. An image processing system for identifying car stealer as described in claim 3, which is characterized by comprising an infrared light projector set in the car room, to be used with the aforementioned image taking device for night vision.

16. An image processing system for identifying car stealer as described in claim 4, which is characterized by comprising an infrared light projector set in the car room, to be used with the aforementioned image taking device for night vision.

* * * * *